United States Patent
Casali et al.

(10) Patent No.: US 6,655,468 B2
(45) Date of Patent: Dec. 2, 2003

(54) DEVICE FOR ATTACHING FARM IMPLEMENTS TO A TRACTOR

(75) Inventors: Paolo Casali, Modena (IT); Paul John Brooks, Modena (IT)

(73) Assignee: New Holland North America, Inc., New Holland, PA (US)

(*) Notice: Subject to any disclaimer, the term of this patent is extended or adjusted under 35 U.S.C. 154(b) by 8 days.

(21) Appl. No.: 10/155,677

(22) Filed: May 24, 2002

(65) Prior Publication Data

US 2002/0189828 A1 Dec. 19, 2002

(51) Int. Cl.$^7$ ................................................ A01B 63/00
(52) U.S. Cl. .................. 172/439; 172/448; 403/44; 403/46
(58) Field of Search ................... 172/448, 446, 172/447, 439, 677–680, 684.5; 403/43–48; 280/482

(56) References Cited

U.S. PATENT DOCUMENTS

| | | | | |
|---|---|---|---|---|
| 2,929,458 A | * | 3/1960 | Cole | 172/446 |
| 3,053,552 A | * | 9/1962 | Horney | 280/461 |
| 3,174,557 A | * | 3/1965 | Newkirk | 172/319 |
| 3,289,771 A | * | 12/1966 | Bennett | 172/155 |
| 3,460,635 A | * | 8/1969 | Danuser | 172/741 |
| 3,527,308 A | * | 9/1970 | Bernotas et al. | 172/464 |
| 4,222,583 A | * | 9/1980 | Schillings | 172/439 X |
| 4,299,290 A | * | 11/1981 | Nunes, Jr. | 172/449 X |
| 4,778,194 A | * | 10/1988 | Koch et al. | |
| 6,253,859 B1 | * | 7/2001 | Coenen | 172/448 |

* cited by examiner

*Primary Examiner*—Christopher J. Novosad
(74) *Attorney, Agent, or Firm*—John William Stader; Rebecca L. Henkel

(57) ABSTRACT

A device for attaching farm implements to a tractor incorporates a top link having a central body inserted inside a sleeve. Two handles are integral with the sleeve on opposing sides and having respective projecting ends. A hook is provided on the top link for attachment to a farm implement with the hook being fixed to the central body. A joint, fixed to the central body, connects the top crossbar. A lock device locks the projecting ends of the handles inside respective seats.

8 Claims, 5 Drawing Sheets

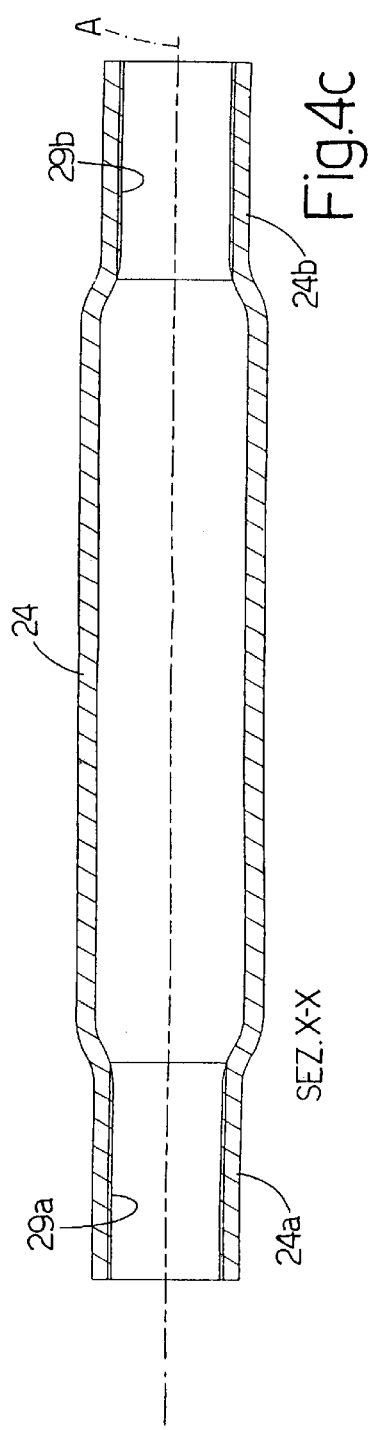
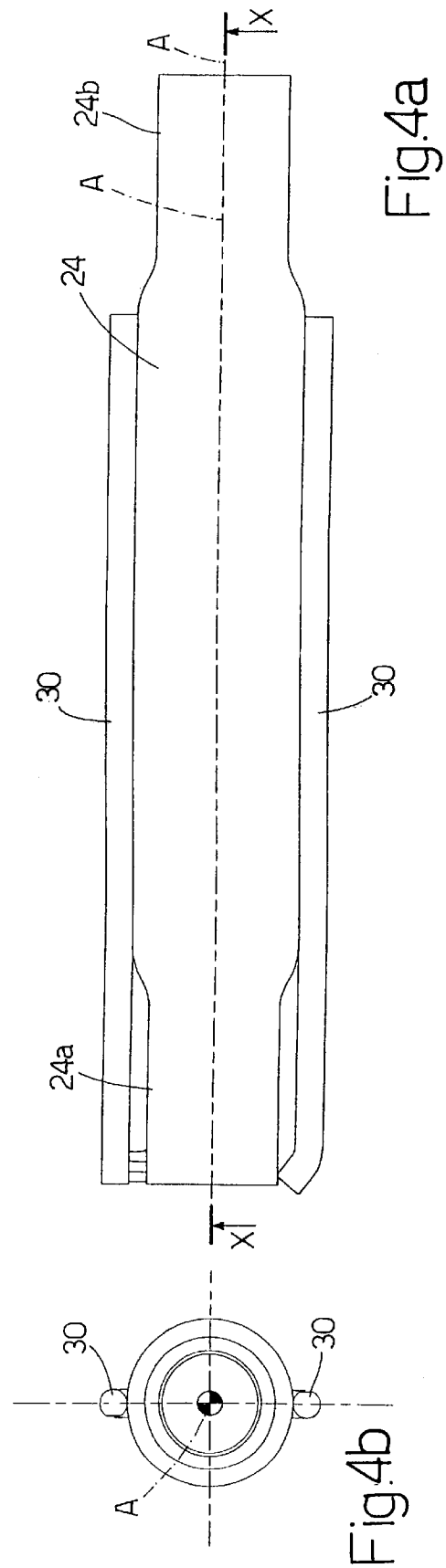

DEVICE FOR ATTACHING FARM IMPLEMENTS TO A TRACTOR

BACKGROUND OF THE INVENTION

The present invention relates to farm implements, particularly to devices for attaching farm implements to a tractor, and more specifically, to a top link of a three-point attachment for attaching a farm implement to a tractor.

A three-point attachment is described, for example, in U.S. Pat. No. 3,053,552, which illustrates means for attaching a farm implement of any type, e.g. a plough, to a tractor, and comprising a top link and two bottom arms. The tie is connected in articulated manner to the tractor frame; each bottom arm is connected to a respective hydraulic lifting device; the length of the top link is adjustable by the operator rotating a sleeve connected at one end to the tractor frame, and at the other end to the implement attachment; and accidental rotation of the sleeve is prevented by an elastic member connected to the sleeve and which can be lifted and lowered. In the invention described in U.S. Pat. No. 3,053,552, when the top link is disconnected from the implement and raised, the elastic member is used to lock the top link in an upright position. However, since the elastic member is integral with the sleeve, the tilt of the top link depends on the position of the sleeve.

Excessive tilting of the top link is negligible in the case of a rear implement attachment, but not in the case of front-mounted implements. In which case, excessive tilting of the top link in the rest position towards the front hood of the tractor could impede opening and closing of the hood.

SUMMARY OF THE INVENTION

It is therefore one object of the present invention to provide a fixed tilt angle for each possible length of the top link.

It is a feature of this invention that the top link is an elastic member.

It is an advantage of this invention that the top link can be easily adjusted in length.

These and other objects, features and advantages are accomplished according to the instant invention by providing a device for attaching farm implements to a tractor incorporating a top link having a central body inserted inside a sleeve. Two handles are integral with the sleeve on opposing sides and having respective projecting ends. A hook is provided on the top link for attachment to a farm implement with the hook being fixed to the central body. A joint, fixed to the central body, connects the top crossbar. A lock device locks the projecting ends of the handles inside respective seats.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4a is an enlarged elevational detail view of the top link depicted in FIGS. 2 and 3;

FIG. 4b is an end view corresponding to the elevational view of FIG. 4a;

FIG. 4c is a cross-sectional view of the top link taken along line X—X of FIG. 4a;

FIG. 8b is a side elevational view of the structure depicted in FIG. 8a.

DETAILED DESCRIPTION OF THE PREFERRED EMBODIMENT

Figure 1:
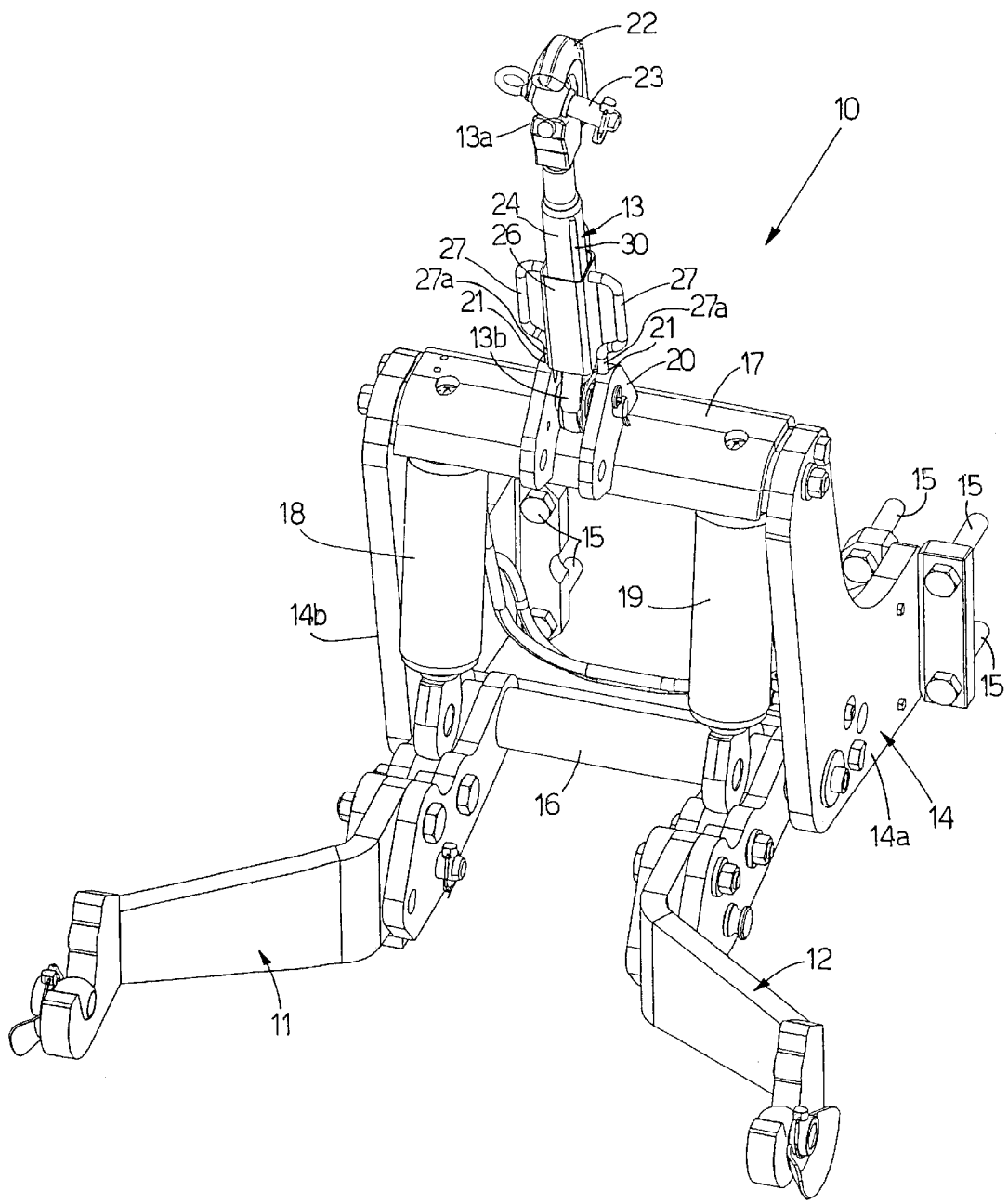
FIG. 1 is a perspective view of a device for attaching farm implements to a tractor incorporating the principles of the present invention.
Figure 2:
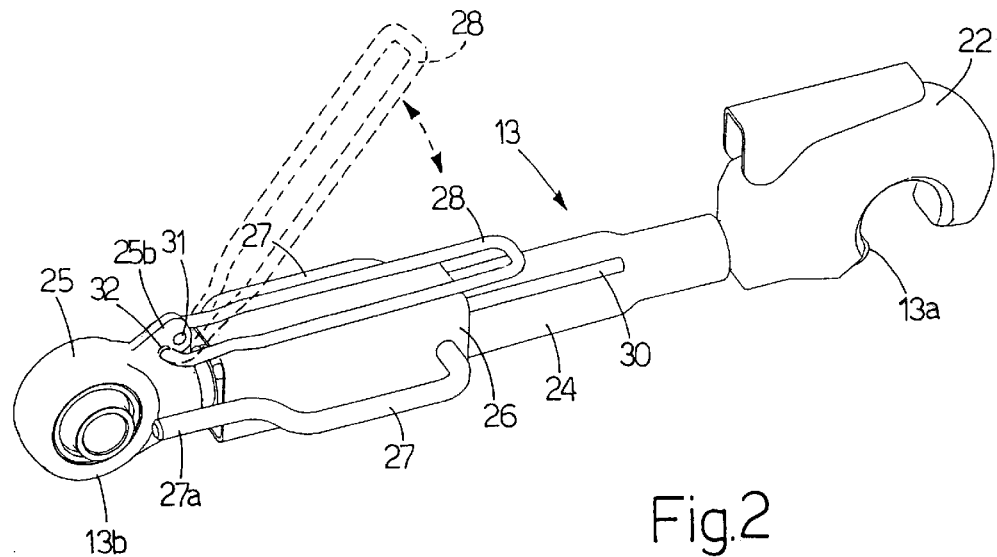
FIG. 2 is a perspective view of the top link forming part of the device shown in FIG. 1, the component parts being depicted in a first position.
Figure 3:
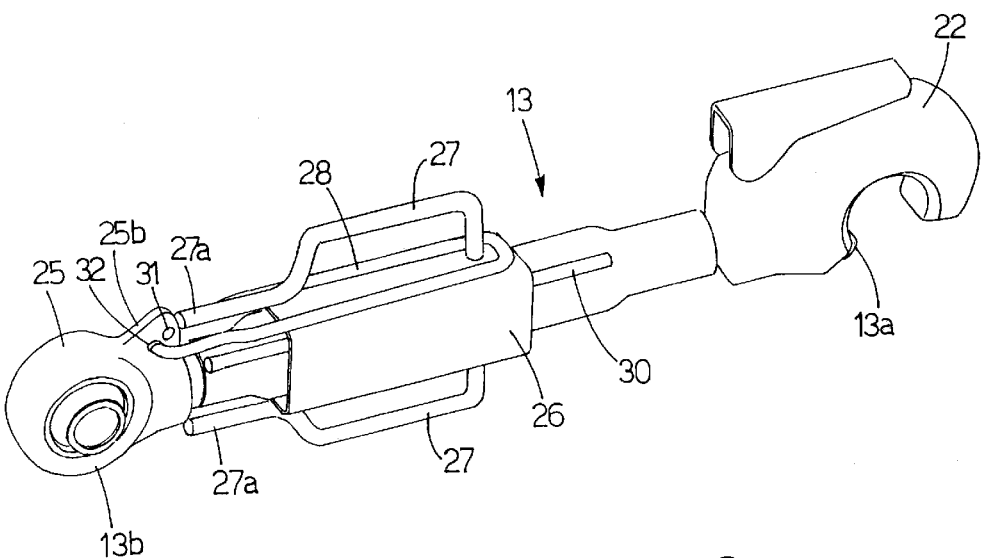
FIG. 3 is a perspective view of the top link similar to that of FIG. 2, but with the component parts being depicted in a second position.

Referring first to FIGS. 1–3, a device 10 for attaching farm implements (not shown) to a tractor (not shown) incorporating the principles of the present invention can best be seen. For the sake of simplicity, a number of mechanical and hydraulic components have been omitted in FIG. 1, and, for the same reason, not all the devices shown in FIG. 1 are described in detail in the present disclosure. One skilled in the art will understand the concept of attaching a farm implement to a tractor to enable the farm implement to obtain operative power from and be towed behind (or in some instances, in front of) the tractor (not shown).

The attachment device 10 includes, in conventional manner, two bottom arms 11, 12; and a top link 13 which, in FIG. 1, is shown in the raised position, i.e. disconnected from the farm implement (not shown). As shown in FIG. 1, the attachment device 10 also is formed with a frame 14, which includes two side plates 14a, 14b connected integrally to the tractor (not shown) by bolts 15. The frame 14 is reinforced by a bottom crossbar 16 and a top crossbar 17. The bottom arms 11, 12 are hinged in known manner to the bottom crossbar 16 and the top crossbar 17 is fitted with hydraulic cylinders 18, 19 for lifting and lowering respective arms 11, 12, and with a lock device 20 for locking top link 13 in the upright position shown in FIG. 1. The lock device 20 has at least two seats 21 as will be explained in greater detail below.

At one end 13a, the top link 13 incorporates a hook 22 having a device 23 to attach the end 13a to the farm implement (not shown). The other end 13b of the top link 13 is hinged to the top crossbar 17.

As shown in FIGS. 2 and 3, the top link 13 is preferably formed with a substantially tubular, circular-section, central body 24; the hook 22 at end 13a; a joint 25 at end 13b for connection to the top crossbar 17; and a square-section sleeve 26 housing the central body 24, which is fitted integrally on opposite sides with two handles 27 having projecting ends 27a as will be described in greater detail below.

The top link 13 also includes an elastic member 28, as will be described below in conjunction with FIG. 8. As shown in greater detail in FIGS. 4a, 4b, 4c, the substantially tubular, central body 24 has two tapered ends 24a, 24b with respective internal threads 29a, 29b to which, as will be seen, are screwed corresponding ends of the hook 22 and the joint 25. The internal threads 29a and 29b are one right-hand and the other left-hand, so that the hook 22 moves to and from the joint 25, depending on the rotation direction of the central body 24 about its central axis A.

As depicted in FIGS. 4a and 4b, two metal rods 30 are simply welded 180° apart to the outer surface of the central body 24 to connect the circular-section central body 24 to the square-section sleeve 26, so as to enable the operator, by means of the sleeve 26, to rotate the central body 24 about the axis A, which enables the sleeve 26 to slide in a direction parallel to axis A for the reasons explained in detail below.

Figure 5:
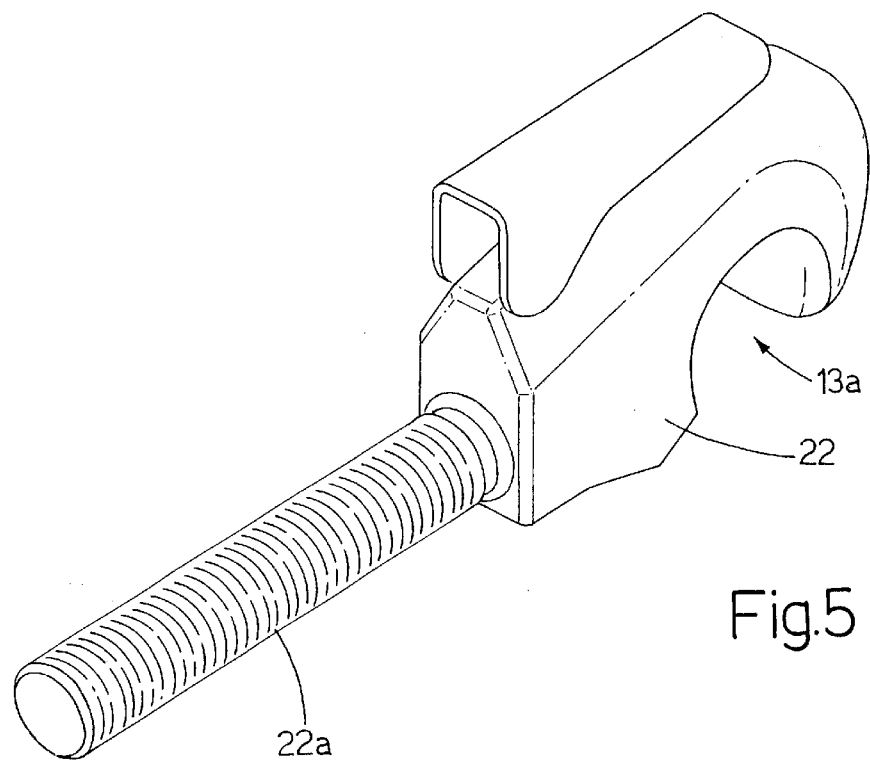
FIG. 5 is an enlarged detail view of a portion of the top link depicted in FIGS. 2 and 3.
Figure 6:
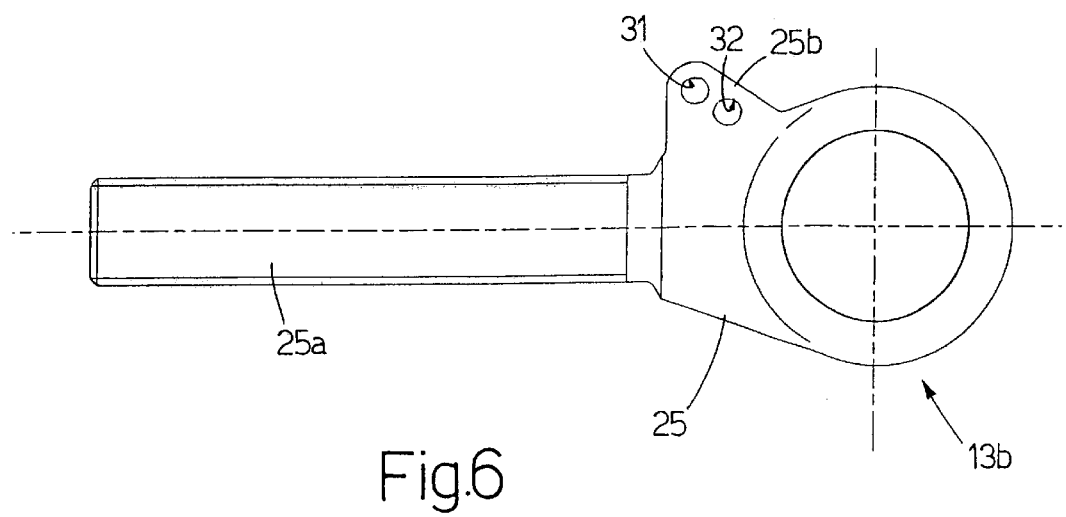
FIG. 6 is another enlarged detail view of the top link depicted in FIGS. 2 and 3.

With reference to FIG. 5, the hook 22 is integral with a threaded shank 22a which screws on to thread 29b in the central body 24. As best seen in FIG. 6, the joint 25 has a threaded shank 25a which screws on to thread 29a in the central body 24. The joint 25 is also formed with a lug 25b (FIG. 6) having holes 31, 32 for housing the ends of the elastic member 28, as explained in detail below.

Figure 7:
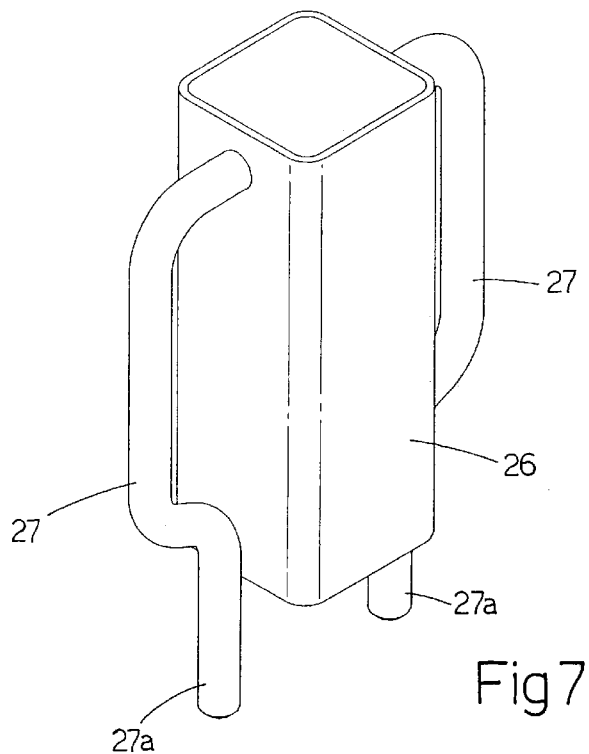
FIG. 7 is still another detail view of the top link depicted in FIGS. 2 and 3.

As stated above, with the threads in ends 24a, 24b being one right-hand and the other left-hand, the top link 13 as a whole is lengthened or shortened as required when the central body 24 is rotated one way or the other by means of the sleeve 26. As best seen in FIG. 7, the sleeve 26 has two handles 27 having projecting ends 27a.

Figure 8A:
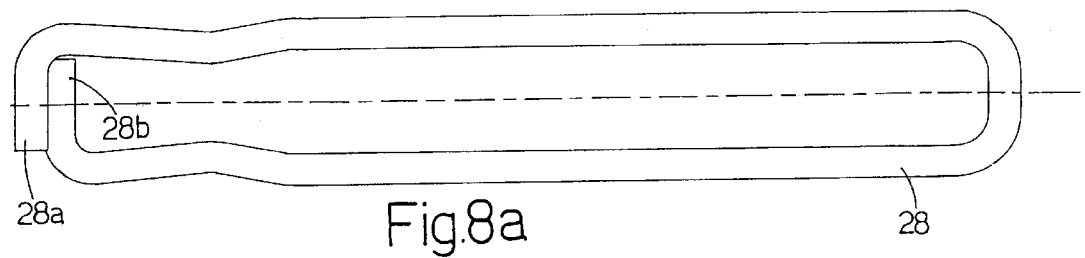
FIG. 8a is a plan view of a portion of the top link depicted in FIGS. 2 and 3.
Figure 8B:
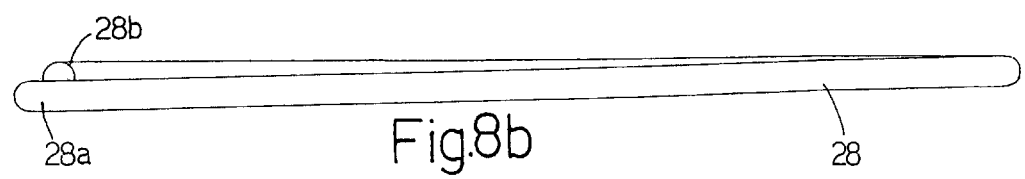

Another fundamental feature of the top link 13 the elastic member 28, best seen in FIGS. 2, 3 and 8. With reference to FIGS. 8a, 8b, the elastic member 28 is formed by bending a spring steel rod into a substantially rectangular structure having two bent superimposed ends 28a, 28b, which, as shown in FIG. 8b, are not coplanar, so as to fit inside the holes 31, 32 in the joint 25 (FIG. 6) and exert a given elastic pressure when the elastic member 28 rests on an outer face of the sleeve 26.

In actual use, and as shown in FIGS. 2 and 3, the top link 13 is lengthened or shortened by simply raising the elastic member 28, which, as stated, on account of the offset position of ends 28a, 28b and holes 31, 32 in lug 25b into which they are fitted, presses elastically on one face of the sleeve 26 (FIG. 2). When raised by the operator, the elastic member 28 assumes the configuration shown by the hatch line in FIG. 2.

Once the elastic member 28 is raised, the operator rotates the sleeve 26, and therefore the central body 24, by means of the two handles 27, so that, depending on the direction of rotation about axis A, the hook 22 is moved towards or away from the joint 25 to respectively shorten or lengthen the top link 13. Once the top link 13 is set to the required length, the operator simply lowers the elastic member 28, which may be positioned as shown in FIG. 3, i.e. on either side of one of the two handles 27, thus ensuring against accidental torquing or loosening of the sleeve 26 and therefore of the central body 24.

As shown in FIG. 1, when the top link 13 is raised, the projecting ends 27a of the handles 27 can be inserted inside the seats 21 on the lock device 20 by sliding the sleeve 26 with respect to the central body 24 in the direction of axis A, which operation is assisted by the rods 30 interposed between the outer surface of the central body 24 and the inner surface of sleeve 26.

The locking of the top link 13 in the rest position is thus fully independent of the length of the top link 13, which is therefore positioned substantially perpendicular to the ground regardless of its length. This is particularly advantageous in the case of attachment devices 10 for front-mounted farm implements; in which case, when fully raised, the top link 13 in no way impedes opening or closing of the hood. The lock device 20 may include a number of pairs of seats 21 to enable different tilt positions of the top link 13 when disconnected from the farm implement (FIG. 1).

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a hitch device associating with a tractor for attaching a farm implement thereto, said hitch device having two bottom arms powered by respective hydraulic cylinders, and a top link adjustable in length, the improvement in said top link comprising:

a central body inserted inside a sleeve, said central body having a substantially circular cross section, and said sleeve having a substantially square cross section and being integrally formed with two handles positioned on opposite sides of said sleeve, said handles having respective projecting ends;

said sleeve further including at least two rods interposed between an outer surface of said central body and an inner surface of said sleeve so that the sleeve rotates said central body about an axis, and so that said sleeve slides with respect to said central body in a direction defined by said axis;

a hook for attachment to said farm implement, said hook having a threaded shank which screws into a first threaded opening formed in said central body;

a joint for connection to a top crossbar interconnecting said bottom arms, said joint having a threaded shank which screws into a second threaded opening in said central body; and a lock device for locking said projecting ends of said handles inside respective seats.

2. The hitch device of claim 1, wherein said lock device is integral with said top crossbar.

3. The hitch device of claim 2, wherein said lock device includes a plurality of pairs of said seats.

4. An adjustable top link for a hitch device for attaching a farm implement to a tractor comprising:

a central body inserted inside a sleeve; said central body having a substantially circular cross section, and said sleeve having a substantially square cross section, at least two rods being interposed between an outer surface of said central body and an inner surface of said sleeve, so that the sleeve rotates said central body about an axis, and so that said sleeve slides with respect to said central body in a direction defined by said axis;

a hook for attachment to said farm implement, said hook having a threaded shank which screws into a first threaded opening formed in said central body;

a joint for connection to a top crossbar interconnecting a pair of bottom arms of said hitch device, said joint having a threaded shank which screws into a second threaded opening formed in said central body; and two handles integrally formed on, and positioned on opposite sides of said sleeve, said handles having respective projecting ends.

5. The top link of claim 4 further comprising an elastic member for preventing rotation of said sleeve.

6. The top link of claim 5, wherein said elastic member is substantially rectangular and has two ends which are inserted inside respective holes formed in opposite faces of a lug on said joint.

7. The top link of claim 6, wherein said ends of said elastic member are offset with respect to each other; and wherein said holes are also offset with respect to each other.

8. The top link of claim 5, wherein said elastic member had a length sufficient to accommodate one of said handles, so as to lock and prevent accidental rotation of said sleeve.

* * * * *